(12) United States Patent
Otsuki et al.

(10) Patent No.: US 12,167,118 B2
(45) Date of Patent: Dec. 10, 2024

(54) IMAGING APPARATUS AND CONTROL METHOD THEREOF

(71) Applicant: CANON KABUSHIKI KAISHA, Tokyo (JP)

(72) Inventors: Jun Otsuki, Kanagawa (JP); Yuzo Matsui, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 192 days.

(21) Appl. No.: 17/843,042

(22) Filed: Jun. 17, 2022

(65) Prior Publication Data

US 2022/0417421 A1    Dec. 29, 2022

(30) Foreign Application Priority Data

Jun. 25, 2021    (JP) .................................. 2021-105681

(51) Int. Cl.
*H04N 5/232*    (2006.01)
*H04N 23/611*    (2023.01)
*H04N 23/68*    (2023.01)

(52) U.S. Cl.
CPC ......... *H04N 23/611* (2023.01); *H04N 23/681* (2023.01)

(58) Field of Classification Search
CPC .... H04N 23/611; H04N 23/681; H04N 23/75; H04N 23/651; G06V 10/12; G06V 40/161
See application file for complete search history.

(56) References Cited

U.S. PATENT DOCUMENTS

| 5,973,319 A | * | 10/1999 | Washisu | H04N 23/68 348/208.11 |
| 6,131,898 A | * | 10/2000 | Hiroi | B65H 3/0615 271/118 |
| 7,432,953 B2 | * | 10/2008 | Washisu | H04N 23/6812 348/208.11 |
| 7,945,152 B2 | * | 5/2011 | Hirai | H04N 23/611 348/349 |

(Continued)

FOREIGN PATENT DOCUMENTS

| JP | 11-242733 A | 9/1999 |
| JP | 2007-208934 A | 8/2007 |
| JP | 2014-027386 A | 2/2014 |

*Primary Examiner* — Philip P. Dang
(74) *Attorney, Agent, or Firm* — Cowan, Liebowitz & Latman, P.C.

(57) ABSTRACT

An imaging apparatus includes: a face detection sensor configured to detect a face of a user; a control unit configured to change an operational state of the imaging apparatus to a first operational state and stop an operation of the face detection sensor; and a movement detecting unit configured to detect a movement of the imaging apparatus, wherein the control unit operates the face detection sensor in response to a detection of a movement of the imaging apparatus by the movement detecting unit in the first operational state, and in a case where the face of the user is not detected by the face detection sensor in the first operational state, the control unit changes the operational state of the imaging apparatus from the first operational state to a second operational state in which power consumption is lower than that in the first operational state.

7 Claims, 7 Drawing Sheets

(56) References Cited

U.S. PATENT DOCUMENTS

| | | | | |
|---|---|---|---|---|
| 8,085,305 B2* | 12/2011 | Kawaguchi | .......... | H04N 23/611 |
| | | | | 348/208.4 |
| 8,554,960 B2* | 10/2013 | Inoue | .............. | A63F 13/23 |
| | | | | 345/158 |
| 8,902,155 B2* | 12/2014 | Kabasawa | ............ | G06F 1/3296 |
| | | | | 345/166 |
| 9,794,491 B2* | 10/2017 | Nakagawara | .......... | H04N 23/73 |
| 10,191,492 B2* | 1/2019 | Ogura | ............ | G05D 1/0278 |
| 10,394,335 B2* | 8/2019 | Tanabe | ............ | G09B 19/003 |
| 10,452,114 B2* | 10/2019 | Fukui | ................ | G06F 1/3203 |
| 10,572,198 B2* | 2/2020 | Yokoyama | ........ | H04N 1/00323 |
| 10,708,467 B2* | 7/2020 | Horishita | ............ | H04N 1/442 |
| 10,962,912 B2* | 3/2021 | Okuzono | ............ | G03G 21/06 |
| 2006/0093386 A1* | 5/2006 | Oki | .............. | G03G 15/0131 |
| | | | | 399/49 |
| 2009/0021548 A1* | 1/2009 | Suzuki | ............ | B41J 2/17566 |
| | | | | 347/14 |
| 2016/0142575 A1* | 5/2016 | Yokoyama | ........ | H04N 1/00896 |
| | | | | 358/1.15 |
| 2022/0008810 A1* | 1/2022 | Kim | .............. | A63C 17/12 |

* cited by examiner

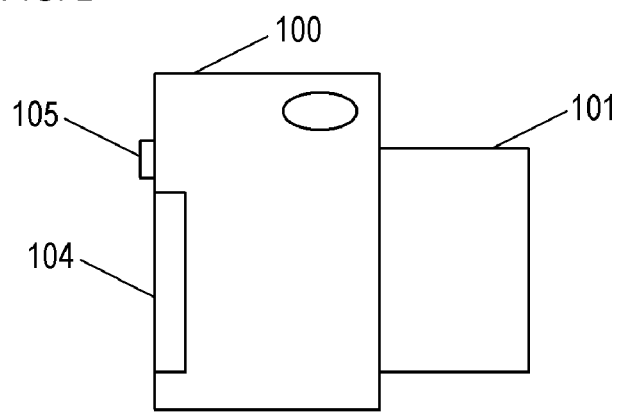

FIG. 3

| OPERATIONAL STATE OF IMAGING APPARATUS 100 | IMAGING UNIT 102 | IMAGE PROCESSING UNIT 103 | DISPLAY UNIT 104 | ACCELERATION SENSOR 106 | RECORDING UNIT 107 | FACE DETECTION SENSOR 110 | MAGNITUDE OF POWER CONSUMPTION OF IMAGING APPARATUS 100 (DESCENDING ORDER) |
|---|---|---|---|---|---|---|---|
| PHOTOGRAPHY STATE | OPERATIONAL | OPERATIONAL | OPERATIONAL (NORMAL) | OPERATIONAL | OPERATIONAL | DOES NOT OPERATE | 1ST |
| PHOTOGRAPHY STANDBY STATE | OPERATIONAL | OPERATIONAL | OPERATIONAL (NORMAL) | OPERATIONAL | DOES NOT OPERATE | DOES NOT OPERATE | 2ND |
| STANDBY STATE | OPERATIONAL | OPERATIONAL | OPERATIONAL (POWER-SAVING) | OPERATIONAL | DOES NOT OPERATE | OPERATIONAL | 3RD |
| POWER-SAVING STANDBY STATE | DOES NOT OPERATE | DOES NOT OPERATE | DOES NOT OPERATE | DOES NOT OPERATE | DOES NOT OPERATE | OPERATIONAL | 4TH |
| SLEEP STATE | DOES NOT OPERATE | DOES NOT OPERATE | DOES NOT OPERATE | DOES NOT OPERATE | DOES NOT OPERATE | DOES NOT OPERATE | 5TH |

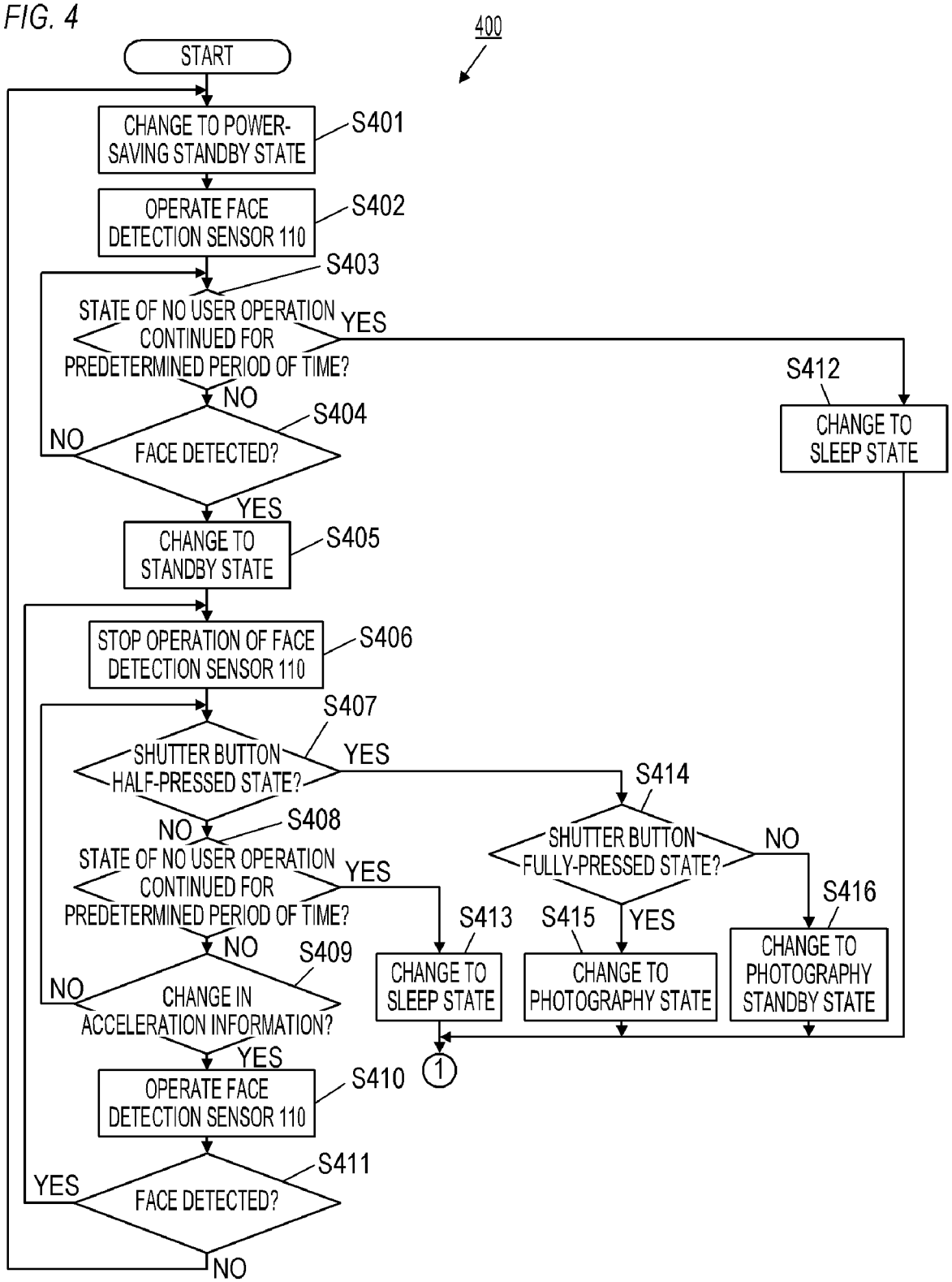

IMAGING APPARATUS AND CONTROL METHOD THEREOF

BACKGROUND OF THE INVENTION

Field of the Invention

The present invention relates to an imaging apparatus and a control method thereof.

Description of the Related Art

Japanese Patent Application Laid-open No. 2007-208934 describes a configuration which changes an operating mode of an imaging apparatus to a low-consumption mode in which power consumed by the imaging apparatus is low when a state where there is no user operation with respect to the imaging apparatus continues for a predetermined period of time.

In an imaging apparatus, it is required that power consumption of the imaging apparatus be reduced by various methods in order to extend an operation time of the imaging apparatus. For example, an imaging apparatus having a face detection sensor which detects the face of a user (photographer) is expected to consume more power than an imaging apparatus not having a face detection sensor. Therefore, in an imaging apparatus having a face detection sensor, it is also required that power consumption of the imaging apparatus be reduced in a similar manner to other imaging apparatuses. Furthermore, in an imaging apparatus having an eye-gaze detection sensor which detects an eye-gaze of a user (photographer), it is also required that power consumption of the imaging apparatus be reduced in a similar manner to an imaging apparatus having a face detection sensor.

SUMMARY OF THE INVENTION

According to an aspect of the embodiments, power consumption of an imaging apparatus is to be made reducible.

One of imaging apparatuses according to the present invention is an imaging apparatus including: a face detection sensor configured to detect a face of a user; a CPU; and a memory storing a program which when executed by the CPU, causes the imaging apparatus to function as: a control unit configured to change an operational state of the imaging apparatus to a first operational state and stop an operation of the face detection sensor; and a movement detecting unit configured to detect a movement of the imaging apparatus, wherein the control unit operates the face detection sensor in response to a detection of a movement of the imaging apparatus by the movement detecting unit in the first operational state, and in a case where the face of the user is not detected by the face detection sensor in the first operational state, the control unit changes the operational state of the imaging apparatus from the first operational state to a second operational state in which power consumption is lower than that in the first operational state.

Further features of the present invention will become apparent from the following description of exemplary embodiments with reference to the attached drawings.

BRIEF DESCRIPTION OF THE DRAWINGS

FIG. 2 is a diagram showing an example of an external appearance of the imaging apparatus 100;

FIG. 3 is a diagram for explaining an operational state of the imaging apparatus 100;

FIG. 4 is a flow chart for explaining processing 400 performed by the imaging apparatus 100.

DESCRIPTION OF THE EMBODIMENTS

Hereinafter, embodiments of the present invention will be described with reference to the drawings. However, it is to be understood that the present invention is not limited to the following embodiments.

First Embodiment

Figure 1:
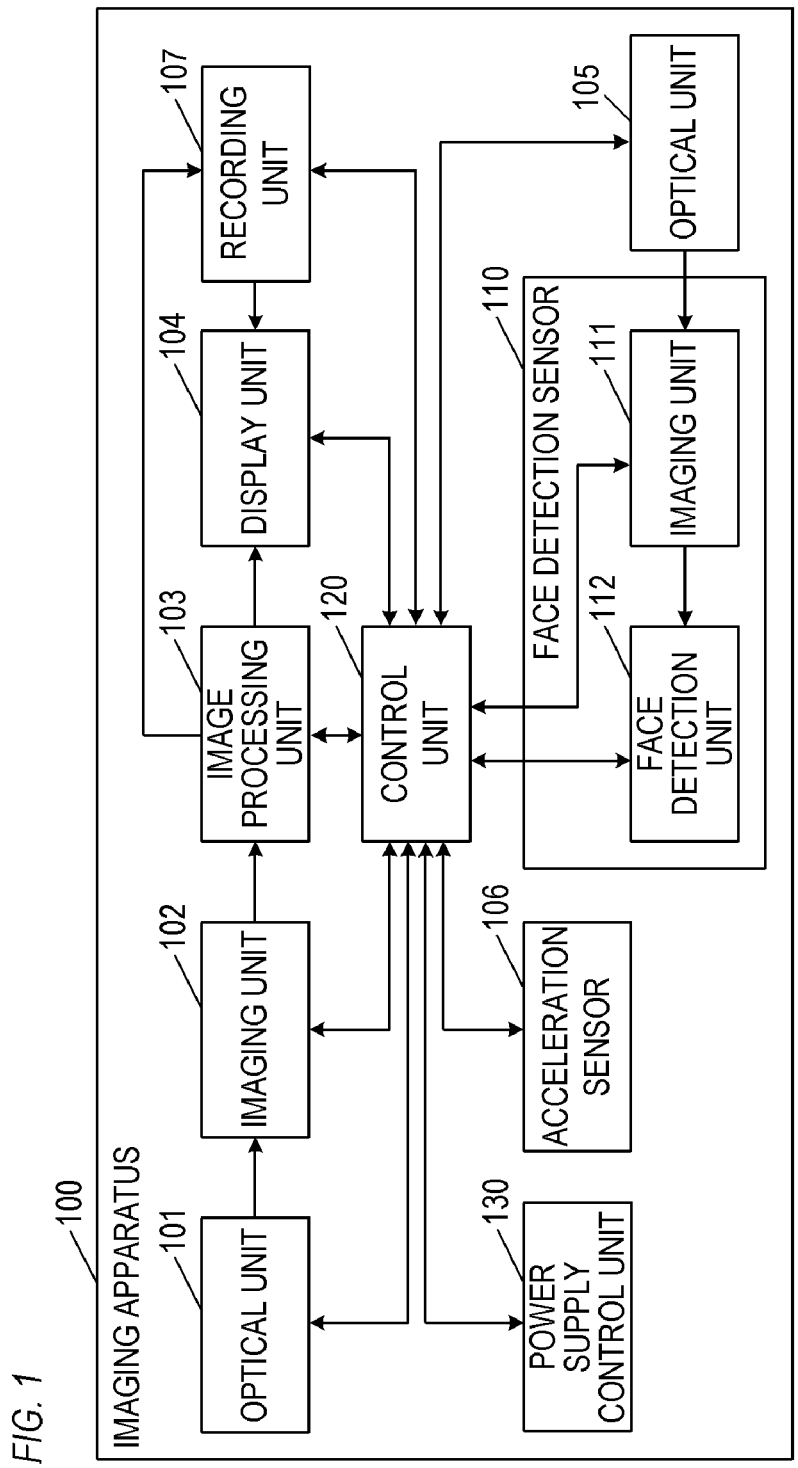
FIG. 1 is a block diagram for explaining an example of a configuration of an imaging apparatus 100.

FIG. 1 is a block diagram for explaining an example of a configuration of an imaging apparatus 100 according to a first embodiment, and FIG. 2 is a diagram showing an example of an external appearance of the imaging apparatus 100.

As shown in FIG. 1, the imaging apparatus 100 has an optical unit 101, an imaging unit 102, an image processing unit 103, a display unit 104, an optical unit 105, an acceleration sensor 106, a face detection sensor 110, a control unit 120, and a power supply control unit 130. Each constituent element of the imaging apparatus 100 has an electronic circuit for realizing one or a plurality of functions provided by the constituent element.

The optical unit 101 includes a lens unit provided on a front surface side (an object side) of the imaging apparatus 100 and is used to image an object. Light incident from the optical unit 101 irradiates the imaging unit 102.

The imaging unit 102 includes an imaging sensor such as a CCD (Charge-Coupled Device) image sensor or a CMOS (Complementary Metal Oxide Semiconductor) image sensor. A light receiving surface of the imaging sensor included in the imaging unit 102 faces the front (the object side) of the imaging apparatus 100. The imaging unit 102 generates a picked-up image (digital data) from the object image obtained via the optical unit 101 and supplies the image processing unit 103 with the picked-up image.

The image processing unit 103 performs predetermined image processing (including image analysis processing) on the picked-up image supplied from the imaging unit 102 and supplies the display unit 104 and the recording unit 107 with the processed picked-up image. Furthermore, the image processing unit 103 supplies the control unit 120 with image information which is information related to the picked-up image. Image information includes a color of the picked-up image and brightness of the picked-up image.

The display unit 104 displays the picked-up image supplied from the image processing unit 103 and other information on a display device which is a liquid crystal display, an organic EL (Electro Luminescence) display, or the like.

The optical unit 105 includes a lens unit provided on a rear surface side (a photographer side) of the imaging apparatus 100 and is mainly used to pick up the face of a user (a photographer). Light incident from the optical unit 105 irradiates the face detection sensor 110.

The acceleration sensor 106 detects acceleration applied to the imaging apparatus 100. The acceleration sensor 106 supplies the control unit 120 with acceleration information including a magnitude and a direction of the detected acceleration at a predetermined time interval. The predetermined time interval is, for example, 0.02 seconds.

The recording unit 107 is capable of recording the picked-up image supplied from the image processing unit 103 in a recording medium (for example, a memory card) connected to the imaging apparatus 100. The recording unit 107 is also capable of reproducing, from the recording medium, a picked-up image selected by the user from the one or more picked-up images recorded in the recording medium. The picked-up image reproduced from the recording medium by the recording unit 107 is displayed on the display unit 104.

The face detection sensor 110 is a face detection unit which detects the face of the user. The face detection sensor 110 has an imaging unit 111 and a face detection unit 112. The imaging unit 111 includes an imaging sensor which is a CCD image sensor, a CMOS image sensor, or the like. A light receiving surface of the imaging sensor included in the imaging unit 111 faces the rear (the photographer side) of the imaging apparatus 100. The imaging unit 111 generates a picked-up image (digital data) from the object image obtained via the optical unit 105 and supplies the face detection unit 112 with the picked-up image. The face detection unit 112 performs predetermined image processing (including image analysis processing) on the picked-up image supplied from the imaging unit 111. Furthermore, the face detection unit 112 detects the face of a person from the picked-up image and supplies the control unit 120 with a detection result of the face. For example, the detection result of the face includes information indicating whether or not a face of a person is included in the picked-up image or information indicating how many human faces are included in the picked-up image.

The control unit 120 is capable of controlling each constituent element of the imaging apparatus 100. For example, the control unit 120 has a memory which stores a program and a hardware processor (or a microcomputer or a CPU) which controls each constituent element of the imaging apparatus 100 by executing the processor stored in the memory to execute various functions. The control unit 120 acquires image information from the image processing unit 103, acquires acceleration information from the acceleration sensor 106, and acquires a face detection result (a result of face detection) from the face detection sensor 110. In addition, based on at least one of the image information, the acceleration information, and the face detection result, the control unit 120 controls an operational state of the imaging apparatus 100 by controlling operations of the constituent elements (including the imaging unit 102, the image processing unit 103, the display unit 104, the recording unit 107, and the face detection sensor 110) of the imaging apparatus 100.

The power supply control unit 130 supplies necessary power to each unit of the imaging apparatus 100 using power from a battery (not illustrated). Due to the control unit 120 controlling power supply from the power supply control unit 130, power supply to each unit is controlled in various states including a power on-state, a photography state, a photography standby state, a standby state, a power-saving standby state, a sleep state, and a power off-state to be described later. In each state, the power supply control unit 130 limits or stops power supply to functional blocks which are not operational.

Next, operational states of the imaging apparatus 100 will be described with reference to FIG. 3. As shown in FIG. 3, operational states of the imaging apparatus 100 include the power on-state, the photography state, the photography standby state, the standby state, the power-saving standby state, the sleep state, and the power off-state. The photography state, the photography standby state, the standby state, the power-saving standby state, and the sleep state are operational states to which the imaging apparatus 100 can transition when the operational state of the imaging apparatus 100 is the power on-state. A magnitude relationship of power consumption (a maximum or average power consumption per unit time) of the imaging apparatus 100 is expressed as photography state>photography standby state>standby state>power-saving standby state>sleep state>power off-state. The power on-state is an operational state when the power supply switch of the imaging apparatus 100 is in an on-state and the power off-state is an operational state when the power supply switch of the imaging apparatus 100 is in an off-state.

The photography state is an operational state in which all of focus processing, exposure processing, white balance processing, imaging of an object, display of a picked-up image (an image of the object), and recording of the picked-up image can be performed. When the operational state of the imaging apparatus 100 is the photography state, the imaging unit 102, the image processing unit 103, the display unit 104, the acceleration sensor 106, and the recording unit 107 are operational but the face detection sensor 110 does not operate. Since the face detection sensor 110 does not operate, the imaging apparatus 100 in the photography state cannot perform face detection processing. Focus processing is processing which is performed in order to bring the object into focus and which is performed by the control unit 120. When the control unit 120 performs focus processing, the control unit 120 brings the object into focus by controlling a lens position of the optical unit 101. Exposure processing is processing which is performed in order to adjust brightness of a picked-up image and which is performed by the control unit 120. When the control unit 120 performs exposure processing, the control unit 120 adjusts brightness of the picked-up image by controlling a degree of opening of an aperture included in the optical unit 101 and a shutter speed of a shutter included in the imaging unit 102. White balance processing is processing which is performed in order to adjust a white balance of a picked-up image and which is performed by the image processing unit 103. Imaging of the object is performed by the imaging unit 102, display of a picked-up image is performed by the display unit 104, and recording of the picked-up image is performed by the recording unit 107.

The photography standby state is an operational state in which all of focus processing, exposure processing, white balance processing, imaging of the object, and display of a picked-up image can be performed. When the operational state of the imaging apparatus 100 is the photography standby state, the imaging unit 102, the image processing unit 103, the display unit 104, and the acceleration sensor 106 are operational but the recording unit 107 and the face detection sensor 110 do not operate. Since the recording unit 107 and the face detection sensor 110 do not operate, the imaging apparatus 100 in the photography standby state cannot perform recording of a picked-up image and face detection processing. The recording unit 107 is operational when the operational state of the imaging apparatus 100 is the photography state. However, the recording unit 107 does not operate when the operational state of the imaging apparatus 100 is the photography standby state. Therefore, power consumption of the imaging apparatus 100 when the operational state of the imaging apparatus 100 is the photography standby state is lower than power consumption of the imaging apparatus 100 when the operational state of the imaging apparatus 100 is the photography state.

The standby state (the first operational state) is an operational state in which all of imaging of the object and display of a picked-up image can be performed. When the operational state of the imaging apparatus 100 is the standby state, imaging of the user and face detection processing may be performed. Imaging of the user is performed by the imaging unit 111 of the face detection sensor 110. Face detection processing is processing which is performed in order to detect the face of the user and which is performed by the face detection unit 112 of the face detection sensor 110. When the operational state of the imaging apparatus 100 is the standby state, the imaging unit 102, the image processing unit 103, the display unit 104, the acceleration sensor 106, and the face detection sensor 110 are operational but the recording unit 107 does not operate. Since the recording unit 107 does not operate, the imaging apparatus 100 in the standby state cannot perform recording of a picked-up image. The face detection sensor 110 does not operate when the operational state of the imaging apparatus 100 is the photography standby state. In addition, the face detection sensor 110 is operational when the operational state of the imaging apparatus 100 is the standby state. Furthermore, power consumption of the display unit 104 when the operational state of the imaging apparatus 100 is the standby state is lower than power consumption of the display unit 104 when the operational state of the imaging apparatus 100 is the photography state or the photography standby state. For example, the control unit 120 controls a frame rate or an operation clock of the display unit 104 when the operational state of the imaging apparatus 100 is the standby state so as to be lower than a frame rate or an operation clock of the display unit 104 when the operational state of the imaging apparatus 100 is the photography state or the photography standby state. Due to a difference in power consumption of the display unit 104, power consumption of the imaging apparatus 100 when the operational state of the imaging apparatus 100 is the standby state is lower than power consumption of the imaging apparatus 100 when the operational state of the imaging apparatus 100 is the photography standby state.

The power-saving standby state (the second operational state) is an operational state in which all of imaging of the user and face detection processing can be performed. When the operational state of the imaging apparatus 100 is the power-saving standby state, the face detection sensor 110 is operational but the imaging unit 102, the image processing unit 103, the display unit 104, the acceleration sensor 106, and the recording unit 107 do not operate. Since the imaging unit 102, the image processing unit 103, the display unit 104, the acceleration sensor 106, and the recording unit 107 do not operate, the imaging apparatus 100 in the power-saving standby state cannot perform focus processing, exposure processing, white balance processing, imaging of an object, displaying of a picked-up image, and recording of the picked-up image. When the operational state of the imaging apparatus 100 is the standby state, the imaging unit 102, the image processing unit 103, the display unit 104, and the acceleration sensor 106 are operational. On the other hand, when the operational state of the imaging apparatus 100 is the power-saving standby state, the imaging unit 102, the image processing unit 103, the display unit 104, and the acceleration sensor 106 do not operate. Therefore, power consumption of the imaging apparatus 100 when the operational state of the imaging apparatus 100 is the power-saving standby state is lower than power consumption of the imaging apparatus 100 when the operational state of the imaging apparatus 100 is the standby state.

The sleep state is an operational state in which none of the imaging unit 102, the image processing unit 103, the display unit 104, the acceleration sensor 106, the recording unit 107, and the face detection sensor 110 are operational. Therefore, the imaging apparatus 100 in the sleep state cannot perform focus processing, exposure processing, white balance processing, imaging of an object, displaying of a picked-up image, recording of the picked-up image, and face detection processing. Power consumption of the imaging apparatus 100 when the operational state of the imaging apparatus 100 is the sleep state is lower than power consumption of the imaging apparatus 100 when the operational state of the imaging apparatus 100 is the power-saving standby state.

Next, processing 400 performed by the imaging apparatus 100 will be explained with reference to the flow charts shown in FIGS. 4 to 7. The processing 400 is started when the operational state of the imaging apparatus 100 assumes the power on-state.

In step S401 of FIG. 4, the control unit 120 changes the operational state of the imaging apparatus 100 to the power-saving standby state. After changing the operational state of the imaging apparatus 100 to the power-saving standby state, the control unit 120 advances to step S402.

In step S402, the control unit 120 causes the face detection sensor 110 to operate. After causing the face detection sensor 110 to operate, the control unit 120 advances to step S403.

In step S403, the control unit 120 determines whether or not a state where there is no user operation (for example, button operation) to the imaging apparatus 100 has continued for a predetermined period of time. When the control unit 120 determines that a state where there is no user operation has continued for a predetermined period of time, the control unit 120 advances to step S412, but when the control unit 120 determines that a state where there is no user operation has not continued for a predetermined period of time, the control unit 120 advances to step S404. The predetermined period of time is, for example, five minutes.

In step S412, the control unit 120 changes the operational state of the imaging apparatus 100 to the sleep state. After changing the operational state of the imaging apparatus 100 to the sleep state, the control unit 120 advances to step S417 in FIG. 5.

In step S404, the control unit 120 determines whether or not a face has been detected by the face detection sensor 110 in accordance with a face detection result supplied from the face detection sensor 110. When the control unit 120 determines that a face has been detected, the control unit 120 advances to step S405, but when the control unit 120 determines that a face has not been detected, the control unit 120 advances to step S403.

In step S405, the control unit 120 changes the operational state of the imaging apparatus 100 to the standby state. After changing the operational state of the imaging apparatus 100 to the standby state, the control unit 120 advances to step S406.

In step S406, the control unit 120 stops the operation of the face detection sensor 110. After stopping the operation of the face detection sensor 110, the control unit 120 advances to step S407.

In step S407, the control unit 120 determines whether or not a shutter button (not illustrated) provided on the imaging apparatus 100 is in a half-pressed state. When the control unit 120 determines that the shutter button is in a half-pressed state, the control unit 120 advances to step S414, but when the control unit 120 determines that the shutter button is not in a half-pressed state, the control unit 120 advances to step S408. A case where the shutter button enters a half-pressed state is a case where the shutter button is half-pressed or fully-pressed. In a case where the shutter button is fully-pressed, the shutter button enters a half-pressed state before entering a fully-pressed state. A case where the shutter button does not enter a half-pressed state is a case where the shutter button is neither half-pressed nor fully-pressed.

In step S414, the control unit 120 determines whether or not the shutter button is in a fully-pressed state. When the control unit 120 determines that the shutter button is in a fully-pressed state, the control unit 120 advances to step S415, but when the control unit 120 determines that the shutter button is not in a fully-pressed state (the shutter button is in a half-pressed state), the control unit 120 advances to step S416.

In step S415, the control unit 120 changes the operational state of the imaging apparatus 100 to the photography state. After changing the operational state of the imaging apparatus 100 to the photography state, the control unit 120 advances to step S417 in FIG. 5.

In step S416, the control unit 120 changes the operational state of the imaging apparatus 100 to the photography standby state. After changing the operational state of the imaging apparatus 100 to the photography standby state, the control unit 120 advances to step S417 in FIG. 5.

In step S408, the control unit 120 determines whether or not a state where there is no user operation to the imaging apparatus 100 has continued for a predetermined period of time. When the control unit 120 determines that a state where there is no user operation has continued for a predetermined period of time, the control unit 120 advances to step S413, but when the control unit 120 determines that a state where there is no user operation has not continued for a predetermined period of time, the control unit 120 advances to step S409.

In step S413, the control unit 120 changes the operational state of the imaging apparatus 100 to the sleep state. After changing the operational state of the imaging apparatus 100 to the sleep state, the control unit 120 advances to step S417 in FIG. 5.

In step S409, the control unit 120 compares a latest piece of acceleration information supplied from the acceleration sensor 106 with an immediately preceding piece of acceleration information to determine whether or not a change of a predetermined value or more has occurred in the acceleration detected by the acceleration sensor 106. The control unit 120 determines that a predetermined condition is satisfied when a change of a predetermined value or more has occurred in the acceleration detected by the acceleration sensor 106 but determines that the predetermined condition is not satisfied when a change of a predetermined value or more has not occurred in the acceleration detected by the acceleration sensor 106. When the control unit 120 determines that a change of a predetermined value or more has occurred in the acceleration detected by the acceleration sensor 106, the control unit 120 advances to step S410, but when the control unit 120 determines that a change of a predetermined value or more has not occurred in the acceleration detected by the acceleration sensor 106, the control unit 120 advances to step S407. For example, when the user moves the imaging apparatus 100, a value of the acceleration from the acceleration sensor 106 changes. When the user stops photography and puts down the imaging apparatus 100, the acceleration from the acceleration sensor 106 changes by a predetermined value or more. In this manner, the change in the value of the acceleration from the acceleration sensor 106 indicates a state in which the imaging apparatus 100 is moving. In other words, in S409, a determination can be made as to whether or not the imaging apparatus 100 is moving.

In step S410, the control unit 120 causes the face detection sensor 110 to operate. After causing the face detection sensor 110 to operate, the control unit 120 advances to step S411.

In step S411, the control unit 120 determines whether or not a face has been detected by the face detection sensor 110 in accordance with a face detection result supplied from the face detection sensor 110. When the control unit 120 determines that a face has been detected, the control unit 120 advances to step S406, but when the control unit 120 determines that a face has not been detected, the control unit 120 advances to step S401.

Figure 5:
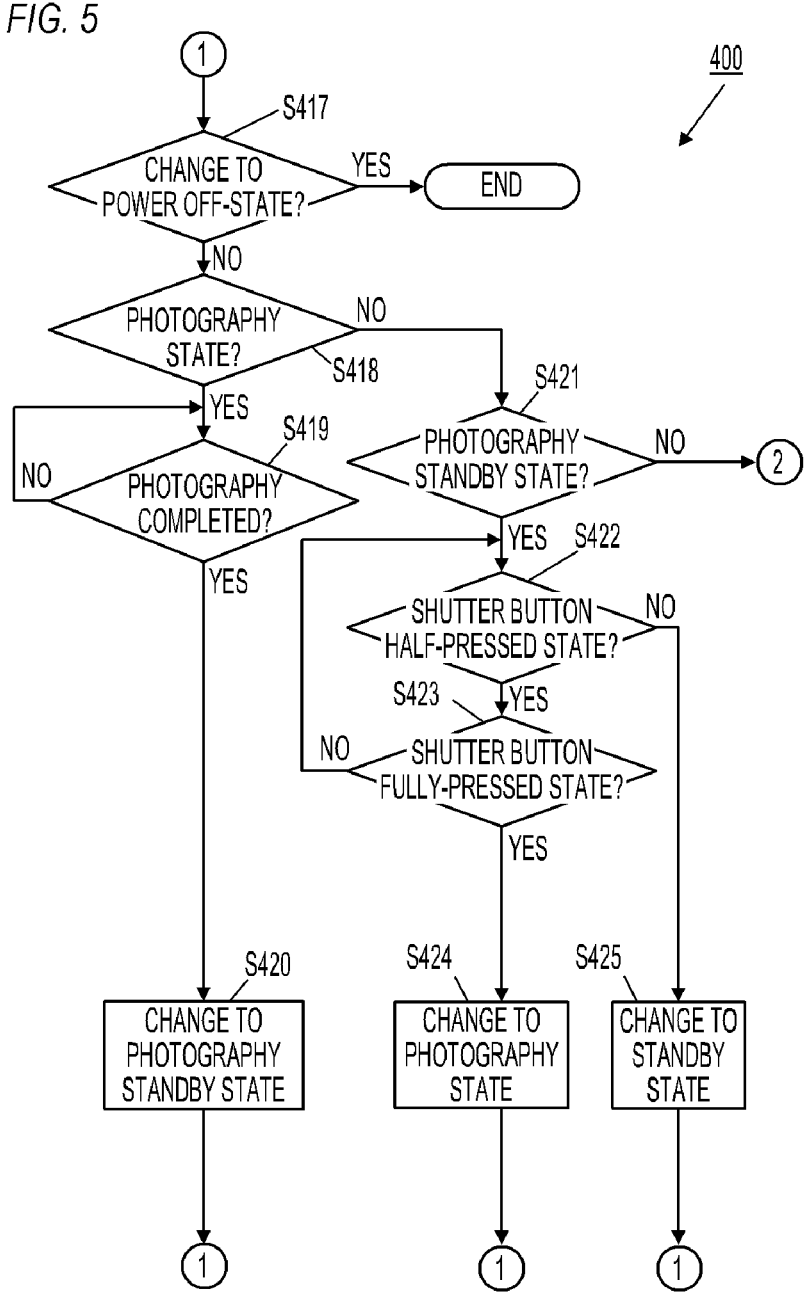
FIG. 5 is a flow chart for explaining the processing 400 performed by the imaging apparatus 100.

In step S417 of FIG. 5, the control unit 120 determines whether or not the operational state of the imaging apparatus 100 is to be changed to the power off-state. When the control unit 120 determines that the operational state of the imaging apparatus 100 is not to be changed to the power off-state, the control unit 120 advances to step S418, but when the control unit 120 determines that the operational state of the imaging apparatus 100 is to be changed to the power off-state, the control unit 120 ends the processing 400. For example, the control unit 120 changes the operational state of the imaging apparatus 100 to the power off-state when a power supply switch (not illustrated) which is provided on the imaging apparatus 100 is changed to an off-state.

In step S418, the control unit 120 determines whether or not the operational state of the imaging apparatus 100 is the photography state. When the control unit 120 determines that the operational state of the imaging apparatus 100 is the photography state, the control unit 120 advances to step S419, but when the control unit 120 determines that the operational state of the imaging apparatus 100 is not the photography state, the control unit 120 advances to step S421.

In step S419, the control unit 120 determines whether or not photography of the object (recording of a picked-up image) has been completed. When the control unit 120 determines that photography has been completed, the control unit 120 advances to step S420, but when the control unit 120 determines that photography has not been completed, the control unit 120 returns to step S419.

In step S420, the control unit 120 changes the operational state of the imaging apparatus 100 to the photography standby state. After changing the operational state of the imaging apparatus 100 to the photography standby state, the control unit 120 advances to step S417.

In step S421, the control unit 120 determines whether or not the operational state of the imaging apparatus 100 is the photography standby state. When the control unit 120 determines that the operational state of the imaging apparatus 100 is the photography standby state, the control unit 120 advances to step S422, but when the control unit 120 determines that the operational state of the imaging apparatus 100 is not the photography standby state, the control unit 120 advances to step S426 in FIG. 6.

In step S422, the control unit 120 determines whether or not the shutter button is in a half-pressed state. When the control unit 120 determines that the shutter button is in a half-pressed state, the control unit 120 advances to step S423, but when the control unit 120 determines that the shutter button is not in a half-pressed state (when the shutter button is neither half-pressed nor fully-pressed), the control unit 120 advances to step S425.

In step S423, the control unit 120 determines whether or not the shutter button is in a fully-pressed state. When the control unit 120 determines that the shutter button is in a fully-pressed state, the control unit 120 advances to step S424, but when the control unit 120 determines that the shutter button is not in a fully-pressed state (the shutter button is in a half-pressed state), the control unit 120 advances to step S422.

In step S424, the control unit 120 changes the operational state of the imaging apparatus 100 to the photography state. After changing the operational state of the imaging apparatus 100 to the photography state, the control unit 120 advances to step S417.

In a case where the operational state of the imaging apparatus 100 is the photography standby state, when the half-press of the shutter button is released, in step S425, the control unit 120 changes the operational state of the imaging apparatus 100 to the standby state. After changing the operational state of the imaging apparatus 100 to the standby state, the control unit 120 advances to step S417.

Figure 6:
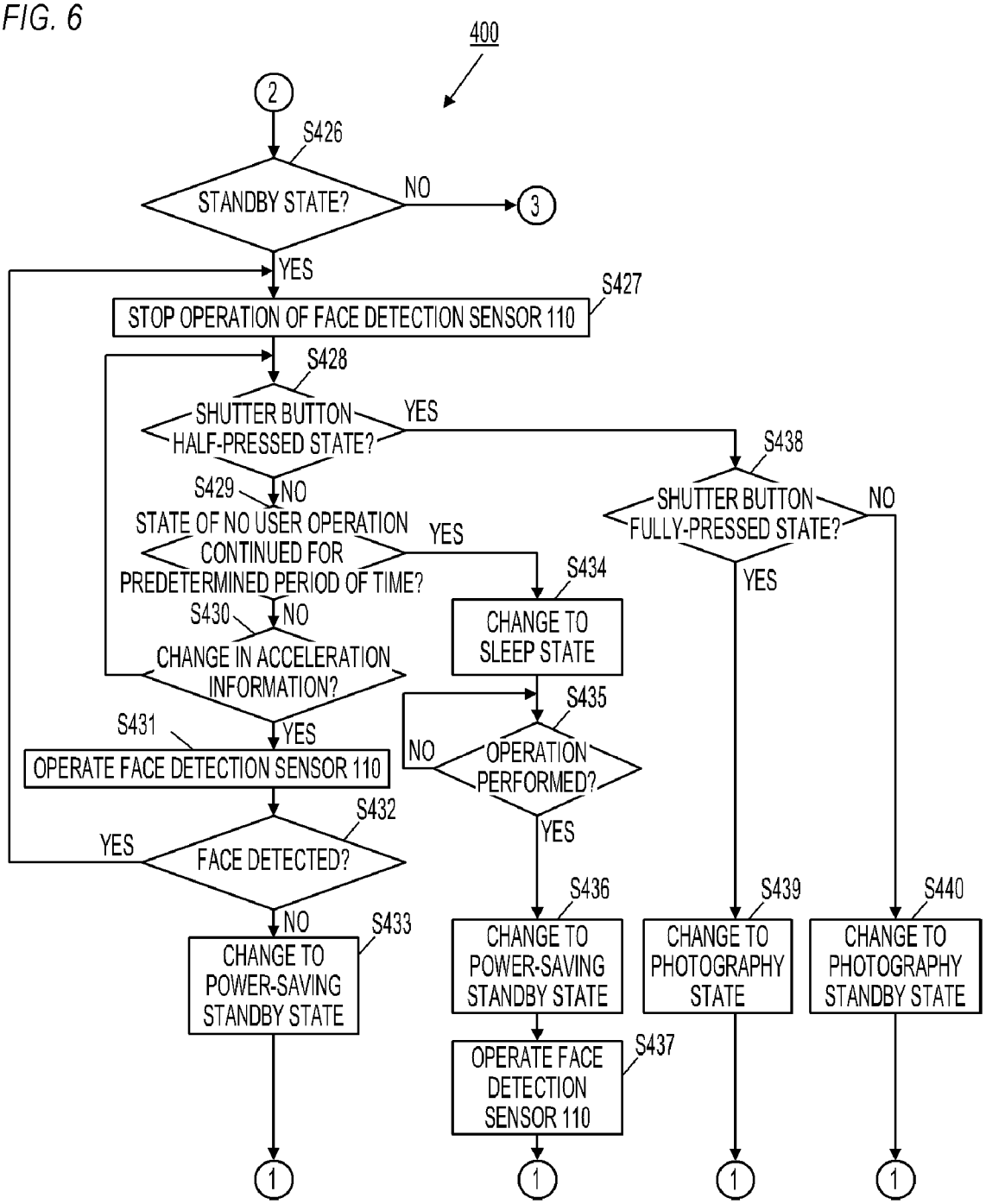
FIG. 6 is a flow chart for explaining the processing 400 performed by the imaging apparatus 100.

In step S426 of FIG. 6, the control unit 120 determines whether or not the operational state of the imaging apparatus 100 is the standby state. When the control unit 120 determines that the operational state of the imaging apparatus 100 is the standby state, the control unit 120 advances to step S427, but when the control unit 120 determines that the operational state of the imaging apparatus 100 is not the standby state, the control unit 120 advances to step S441 in FIG. 7.

In step S427, the control unit 120 stops the operation of the face detection sensor 110. After stopping the operation of the face detection sensor 110, the control unit 120 advances to step S428.

In step S428, the control unit 120 determines whether or not the shutter button is in a half-pressed state. When the control unit 120 determines that the shutter button is in a half-pressed state, the control unit 120 advances to step S438, but when the control unit 120 determines that the shutter button is not in a half-pressed state (when the shutter button is neither half-pressed nor fully-pressed), the control unit 120 advances to step S429.

In step S429, the control unit 120 determines whether or not a state where there is no user operation to the imaging apparatus 100 has continued for a predetermined period of time. When the control unit 120 determines that a state where there is no user operation has continued for a predetermined period of time, the control unit 120 advances to step S434, but when the control unit 120 determines that a state where there is no user operation has not continued for a predetermined period of time, the control unit 120 advances to step S430.

In step S430, the control unit 120 compares a latest piece of acceleration information supplied from the acceleration sensor 106 with an immediately preceding piece of acceleration information to determine whether or not a change of a predetermined value or more has occurred in the acceleration detected by the acceleration sensor 106. The control unit 120 determines that a predetermined condition is satisfied when a change of a predetermined value or more has occurred in the acceleration detected by the acceleration sensor 106 but determines that the predetermined condition is not satisfied when a change of a predetermined value or more has not occurred in the acceleration detected by the acceleration sensor 106. When the control unit 120 determines that a change of a predetermined value or more has occurred in the acceleration detected by the acceleration sensor 106, the control unit 120 advances to step S431, but when the control unit 120 determines that a change of a predetermined value or more has not occurred in the acceleration detected by the acceleration sensor 106, the control unit 120 advances to step S428. In other words, in S430, a determination can be made as to whether or not the imaging apparatus 100 is moving in a similar manner to S409.

In step S431, the control unit 120 causes the face detection sensor 110 to operate. After causing the face detection sensor 110 to operate, the control unit 120 advances to step S432.

In step S432, the control unit 120 determines whether or not a face has been detected by the face detection sensor 110 in accordance with a face detection result supplied from the face detection sensor 110. When the control unit 120 determines that a face has been detected, the control unit 120 advances to step S427, but when the control unit 120 determines that a face has not been detected, the control unit 120 advances to step S433.

In step S433, the control unit 120 changes the operational state of the imaging apparatus 100 to the power-saving standby state. After changing the operational state of the imaging apparatus 100 to the power-saving standby state, the control unit 120 advances to step S417 in FIG. 5.

In step S434, the control unit 120 changes the operational state of the imaging apparatus 100 to the sleep state. After changing the operational state of the imaging apparatus 100 to the sleep state, the control unit 120 advances to step S435.

In step S435, the control unit 120 determines whether or not the imaging apparatus 100 has been operated. When the control unit 120 determines that the imaging apparatus 100 has been operated, the control unit 120 advances to step S436, but when the control unit 120 determines that the imaging apparatus 100 has not been operated, the control unit 120 returns to step S435.

In step S436, the control unit 120 changes the operational state of the imaging apparatus 100 to the power-saving standby state. After changing the operational state of the imaging apparatus 100 to the power-saving standby state, the control unit 120 advances to step S437.

In step S437, the control unit 120 causes the face detection sensor 110 to operate. After causing the face detection sensor 110 to operate, the control unit 120 advances to step S417 in FIG. 5.

In step S438, the control unit 120 determines whether or not the shutter button is in a fully-pressed state. When the control unit 120 determines that the shutter button is in a fully-pressed state, the control unit 120 advances to step S439, but when the control unit 120 determines that the shutter button is not in a fully-pressed state (the shutter button is in a half-pressed state), the control unit 120 advances to step S440.

In step S439, the control unit 120 changes the operational state of the imaging apparatus 100 to the photography state. After changing the operational state of the imaging apparatus 100 to the photography state, the control unit 120 advances to step S417 in FIG. 5.

In step S440, the control unit 120 changes the operational state of the imaging apparatus 100 to the photography standby state. After changing the operational state of the imaging apparatus 100 to the photography standby state, the control unit 120 advances to step S417 in FIG. 5.

Figure 7:
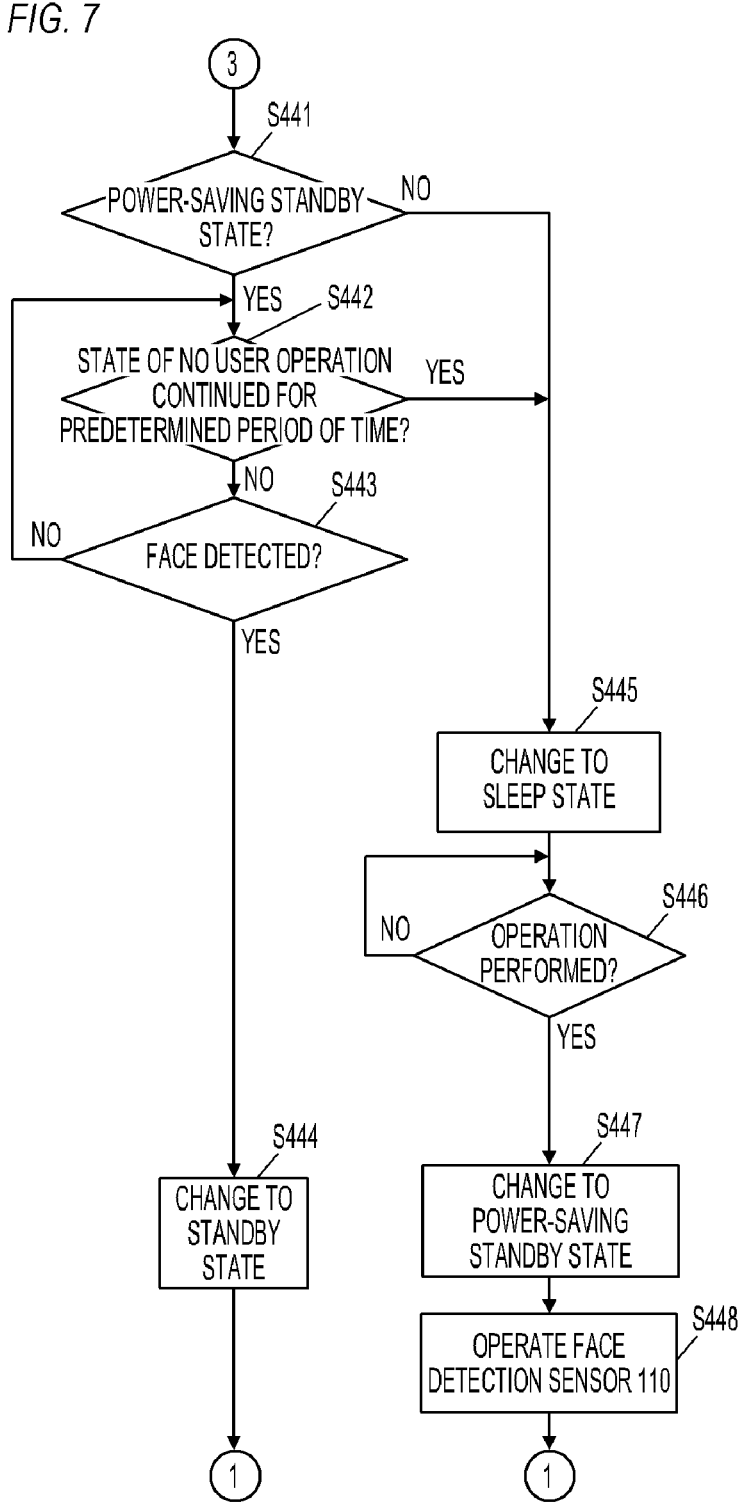
FIG. 7 is a flow chart for explaining the processing 400 performed by the imaging apparatus 100.

In step S441 of FIG. 7, the control unit 120 determines whether or not the operational state of the imaging apparatus 100 is the power-saving standby state. When the control unit 120 determines that the operational state of the imaging apparatus 100 is the power-saving standby state, the control unit 120 advances to step S442, but when the control unit 120 determines that the operational state of the imaging apparatus 100 is not the power-saving standby state, the control unit 120 advances to step S445.

In step S442, the control unit 120 determines whether or not a state where there is no user operation to the imaging apparatus 100 has continued for a predetermined period of time. When the control unit 120 determines that a state where there is no user operation has continued for a predetermined period of time, the control unit 120 advances to step S445, but when the control unit 120 determines that a state where there is no user operation has not continued for a predetermined period of time, the control unit 120 advances to step S443.

In step S443, the control unit 120 determines whether or not a face has been detected by the face detection sensor 110 in accordance with a face detection result supplied from the face detection sensor 110. When the control unit 120 determines that a face has been detected, the control unit 120 advances to step S444, but when the control unit 120 determines that a face has not been detected, the control unit 120 advances to step S442.

In step S444, the control unit 120 changes the operational state of the imaging apparatus 100 to the standby state. After changing the operational state of the imaging apparatus 100 to the standby state, the control unit 120 advances to step S417 in FIG. 5.

In step S445, the control unit 120 changes the operational state of the imaging apparatus 100 to the sleep state. After changing the operational state of the imaging apparatus 100 to the sleep state, the control unit 120 advances to step S446. When the operational state of the imaging apparatus 100 is the sleep state at a time point of step S445, the control unit 120 maintains the operational state of the imaging apparatus 100 at the sleep state.

In step S446, the control unit 120 determines whether or not the imaging apparatus 100 has been operated. When the control unit 120 determines that the imaging apparatus 100 has been operated, the control unit 120 advances to step S447, but when the control unit 120 determines that the imaging apparatus 100 has not been operated, the control unit 120 returns to step S446.

In step S447, the control unit 120 changes the operational state of the imaging apparatus 100 to the power-saving standby state. After changing the operational state of the imaging apparatus 100 to the power-saving standby state, the control unit 120 advances to step S448.

In step S448, the control unit 120 causes the face detection sensor 110 to operate. After causing the face detection sensor 110 to operate, the control unit 120 advances to step S417 in FIG. 5.

As described above, according to the first embodiment, when the operational state of the imaging apparatus 100 is the standby state, the face detection sensor 110 can be prevented from operating until a predetermined condition is satisfied. Specifically, when the face detection sensor 110 has been stopped and the operational state of the imaging apparatus 100 is the standby state, the face detection sensor 110 is operated when a change in an acceleration from the acceleration sensor 106 is detected and a movement of the imaging apparatus 100 is detected. Accordingly, compared to a case where the face detection sensor 110 is constantly operated when the operational state of the imaging apparatus 100 is the standby state, power consumption of the imaging apparatus 100 can be reduced. Furthermore, after operating the face detection sensor 110, a determination is made by the face detection sensor 110 as to whether or not the face of a user has been detected. For example, when the user holds a camera with the intention to take a photograph, the face of the user is detected by the face detection sensor 110. Therefore, the standby state is maintained. This operation is an operation expressed as step S410→YES in step S411→step S406. On the other hand, when the face of the user is not detected, since it is conceivable that the user had simply moved the camera without holding the camera and the user has no intention to take a photograph, the operational state of the imaging apparatus 100 is changed to the power-saving standby state. This operation is an operation expressed as step S410 NO in step S411→step S401. Accordingly, the operational state of the imaging apparatus 100 can be appropriately controlled and power consumption of the imaging apparatus 100 can be further reduced.

In the processing 400 shown in FIGS. 4 to 7, the control unit 120 operates the face detection sensor 110 in a case where a predetermined condition is satisfied when the operational state of the imaging apparatus 100 is the standby state. In the processing 400, the control unit 120 determines that the predetermined condition is satisfied when a change of a predetermined value or more has occurred in an acceleration detected by the acceleration sensor 106. However, the condition for determining whether or not the predetermined condition is satisfied is not limited to whether or not a change of a predetermined value or more has occurred in the acceleration detected by the acceleration sensor 106. For example, various conditions that are satisfied when the user does not perform photography may be adopted as the predetermined condition. Various conditions related to a movement of the imaging apparatus 100 may be adopted as the predetermined condition or various conditions related to a picked-up image (an image of an object) may be adopted as the predetermined condition. For example, when a condition related to the picked-up image is to be adopted as the predetermined condition, the control unit 120 can determine whether or not the predetermined condition is satisfied based on image information (information related to the picked-up image) supplied from the image processing unit 103.

The user may put the imaging apparatus 100 down somewhere when photography is not performed. When the imaging apparatus 100 is put down, there is no longer any movement of the imaging apparatus 100. Therefore, when the imaging apparatus 100 has a motion sensor, the control unit 120 may determine that the predetermined condition is satisfied when the motion sensor does not detect a movement of the imaging apparatus 100 for a predetermined period of time. For example, the motion sensor is an acceleration sensor, a gyro sensor, or the like which can also be used for vibration control, blur correction, and the like of the imaging apparatus 100. In this case, the user is not holding the imaging apparatus 100. Therefore, since the face of the user is not detected by the face detection sensor 110 even when the face detection sensor 110 is operated, the imaging apparatus 100 is changed to the power-saving standby state.

When a lens cap is attached to the optical unit 101, it is highly likely that the user will not perform photography and a monochrome picked-up image without a predetermined edge (a completely black picked-up image without a predetermined edge) is picked up by the imaging unit 102. Similarly, when the optical unit 101 is in proximity of a wall and faces the wall, it is highly likely that the user will not perform photography and a monochrome picked-up image without a predetermined edge (a picked-up image with the color of the wall and without a predetermined edge) is picked up by the imaging unit 102. Therefore, when the image processing unit 103 is to perform edge detection processing (processing for detecting a predetermined edge from the picked-up image), the control unit 120 may determine that the predetermined condition is satisfied when the predetermined edge is not detected from the picked-up image. Furthermore, when the image processing unit 103 is to perform image analysis processing (processing for determining whether or not the picked-up image is a monochrome image), the control unit 120 may determine that the predetermined condition is satisfied when the picked-up image is determined to be a monochrome image. In this case, the user is not holding the imaging apparatus 100. Therefore, since the face of the user is not detected by the face detection sensor 110 even when the face detection sensor 110 is operated, the imaging apparatus 100 is changed to the power-saving standby state.

The user often puts down the imaging apparatus 100 when ceasing photography. A large movement occurs in a picked-up image when the user puts down the imaging apparatus 100. Therefore, when the image processing unit 103 is to perform vector detection processing (processing for detecting a motion vector of which size is a predetermined value or more from the picked-up image), the control unit 120 may determine that the predetermined condition is satisfied when a motion vector of which size is a predetermined value or more is detected from the picked-up image. In this case, the user is not holding the imaging apparatus 100. Therefore, since the face of the user is not detected by the face detection sensor 110 even when the face detection sensor 110 is operated, the imaging apparatus 100 is changed to the power-saving standby state.

The predetermined condition may be a combination of the plurality of conditions described above. When the predetermined condition is a combination of the plurality of conditions described above, the control unit 120 may determine that the predetermined condition is satisfied when at least any of the plurality of conditions described above is satisfied. The control unit 120 may determine that the predetermined condition is satisfied when two or more conditions among the plurality of conditions described above are satisfied. Furthermore, the control unit 120 may determine that the predetermined condition is satisfied when all of the plurality of conditions described above are satisfied.

An orientation of the display unit 104 with respect to the imaging apparatus 100 may be changeable. In addition, the optical unit 105 and the imaging unit 111 (the face detection sensor 110) to be used to image the user may be provided on the display unit 104 so that orientations of the optical unit 105 and the imaging unit 111 (the face detection sensor 110) change in accordance with a change in the orientation of the display portion 104. Since the user often views the display unit 104 when using the imaging apparatus 100, providing the optical unit 105 and the imaging unit 111 (the face detection sensor 110) on the display unit 104 enables imaging of the user using the imaging apparatus 100 to be more reliably performed.

When a tripod is connected to the imaging apparatus 100, the user may often separate himself/herself from the imaging apparatus 100 and the face of the user may no longer be detected by the face detection sensor 110. Therefore, when a tripod is connected to the imaging apparatus 100, the control unit 120 need not change the operational state of the imaging apparatus 100 to the power-saving standby state based on a detection result of the face detection sensor 110. When a tripod is connected to the imaging apparatus 100, the control unit 120 need not operate the face detection sensor 110. When the face detection sensor 110 is not operated, the control unit 120 need not change the operational state of the imaging apparatus 100 to the standby state immediately after changing the operational state to the power-saving standby state and need not change the operational state of the imaging apparatus 100 to the standby state instead of the power-saving standby state. For example, when a tripod is connected to the imaging apparatus 100, the control unit 120 may omit the processing steps of steps S401 to S404, step S406, and steps S409 to S412 in FIG. 4. In this case, when the control unit 120 determines in step S408 that a state where there is no user operation has continued for a predetermined period of time, the control unit 120 advances to step S407 instead of step S409. In a similar manner, when a tripod is connected to the imaging apparatus 100, the control unit 120 may omit step S427 in FIG. 6, steps S430 to S433 in FIG. 6, step S437 in FIG. 6, steps S441 to S444 in FIG. 7, and step S448 in FIG. 7. In this case, when the control unit 120 determines in step S429 of FIG. 6 that a state where there is no user operation has continued for a predetermined period of time, the control unit 120 advances to step S428 instead of step S430. In addition, in step S436 of FIG. 6 and step S447 of FIG. 7, the control unit 120 changes the operational state of the imaging apparatus 100 to the standby state instead of the power-saving standby state.

Detection of the user is not limited to face detection using the face detection sensor 110 and may be eye-gaze detection using an eye-gaze detection sensor. For example, the eye-gaze detection sensor detects an eye-gaze directed toward the imaging apparatus 100 as an eye-gaze of the user.

The imaging apparatus 100 may have a storage unit and a face recognizing unit which recognizes a face detected by the face detection sensor 110 by determining whether or not the detected face is a face registered in the storage unit. In addition, when the face recognizing unit determines that the face detected by the face detection sensor 110 is a face registered in the storage unit, the control unit 120 may determine that the user has been detected. A case where the operational state of the imaging apparatus 100 is the power-saving standby state will now be considered. In this case, the detection of a face by the face detection sensor 110 alone does not cause the control unit 120 to change the operational state of the imaging apparatus 100 to the standby state and the control unit 120 only changes the operational state of the imaging apparatus 100 to the standby state when the face recognizing unit determines that the detected face is a face registered in the storage unit. Next, a case where the operational state of the imaging apparatus 100 is the standby state will now be considered. In this case, even if a face is detected by the face detection sensor 110, when the face recognizing unit determines that the detected face is not a face registered in the storage unit, the control unit 120 changes the operational state of the imaging apparatus 100 to the power-saving standby state. Accordingly, since a person whose face is not registered in the storage unit is unable to change the operational state of the imaging apparatus 100 to any of the photography state, the photography standby state, and the standby state, security of the imaging apparatus 100 can be improved.

When the operational state of the imaging apparatus 100 is the sleep state, the control unit 120 may change the operational state of the imaging apparatus 100 to the standby state instead of the power-saving standby state in response to a user operation to the imaging apparatus 100. For example, in step S436 of FIGS. 6 and S447 of FIG. 7, the control unit 120 changes the operational state of the imaging apparatus 100 to the standby state. Step S437 in FIG. 6 and step S448 in FIG. 7 will be omitted. Since the standby state is a state which enables a picked-up image to be displayed, by changing the operational state of the imaging apparatus 100 from the sleep state to the standby state in response to a user operation to the imaging apparatus 100, the user can start checking the picked-up image in a short period of time from the user operation to the imaging apparatus 100. However, power consumption of the imaging apparatus 100 when the operational state of the imaging apparatus 100 is the power-saving standby state is lower than power consumption of the imaging apparatus 100 when the operational state of the imaging apparatus 100 is the standby state. Therefore, by changing the operational state of the imaging apparatus 100 from the sleep state to the power-saving standby state in response to a user operation to the imaging apparatus 100, power consumption of the imaging apparatus 100 can be reduced as compared to when the operational state of the imaging apparatus 100 is changed to the standby state.

Second Embodiment

At least one of the various functions, processing steps, and methods explained in the embodiment presented above can be realized by having a personal computer, a microcomputer, a CPU (Central Processing Unit), or a microprocessor execute a program. Hereinafter, in the second embodiment, the personal computer, the microcomputer, the CPU, or the microprocessor will be referred to as a "computer X". In the second embodiment, the program for controlling the computer X and for realizing at least one of the various functions, processing steps, and methods explained in the embodiment presented above will be referred to as a "program Y".

At least one of the various functions, processing steps, and methods explained in the embodiment presented above can be realized by having the computer X execute the program Y. In this case, the program Y is supplied to the computer X via a computer-readable storage medium. The computer-readable storage medium according to the second embodiment includes at least one of a hard disk apparatus, a magnetic storage apparatus, an optical storage apparatus, a magneto-optical storage apparatus, a memory card, a volatile memory, a nonvolatile memory, and the like. The computer-readable storage medium according to the second embodiment is a non-transitory storage medium.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, power consumption of an imaging apparatus can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-105681, filed on Jun. 25, 2021, which is hereby incorporated by reference herein in its entirety.

What is claimed is:

1. An imaging apparatus comprising:
a face detection sensor that detects a face of a user and outputs a detection result indicating whether the face of the user is detected or not;
a CPU; and
a memory storing a program which when executed by the CPU, causes the imaging apparatus to function as:
a control unit configured to change an operational state of the imaging apparatus to a first operational state which is a power on state of the imaging apparatus and stop an operation of the face detection sensor; and
a movement determination unit configured to determine whether the imaging apparatus is moving or not,
wherein the control unit causes the face detection sensor to operate in the first operational state if it is determined by the movement determination unit that the imaging apparatus is moving in the first operational state, and
the control unit determines whether the face of the user is detected or not in accordance with the detection result output from the face detection sensor in the first operational state, and
changes the operational state of the imaging apparatus from the first operational state to a second operational state which is the power on state of the imaging apparatus and has lower power consumption than the first operational state if it is determined that the face of the user is not detected in accordance with the detection result output from the face detection sensor in the first operational state;
wherein the imaging apparatus further comprising:
an imaging circuit that performs imaging of an object that differs from the user, wherein the program further causes, when executed by the CPU, the imaging apparatus to function as:
an image processing unit configured to process an image from the imaging circuit; and
a display unit configured to display an image from the image processing unit, wherein in the first operational state, the control unit performs control so that the imaging circuit, the image processing unit, the display unit, and the movement determination unit operate, and in the second operational state, the control unit performs control so that operations of the imaging circuit, the image processing unit, the display unit, and the movement determination unit are stopped.

2. The imaging apparatus according to claim 1, wherein in a case where the operational state of the imaging apparatus is changed from the first operational state to the second operational state, the control unit causes the face detection sensor to operate in the second operational state.

3. The imaging apparatus according to claim 2, wherein the control unit changes the operational state of the imaging apparatus from the second operational state to the first operational state if it is determined that the face of the user is detected in accordance with the detection result output from the face detection sensor in the second operational state and stops the operation of the face detection sensor in the first operational state.

4. The imaging apparatus according to claim 1, wherein if it is determined that the face of the user is detected in the first operational state, the control unit does not change the operational state of the imaging apparatus to the second operational state.

5. The imaging apparatus according to claim 1, further comprising:

an acceleration sensor that outputs acceleration applied to the imaging apparatus, wherein the movement determination unit determines whether an acceleration from the acceleration sensor has changed or not.

6. The imaging apparatus according to claim 1, wherein in the first operational state and the second operational state, in a case where an operation by the user with respect to the imaging apparatus is not performed for a predetermined period, the control unit changes the operational state of the imaging apparatus to a sleep state which is the power on state of the imaging apparatus and has lower power consumption than the second operational state, and in a case where an instruction to turn off power of the imaging apparatus is issued, the control unit changes the operational state of the imaging apparatus to a power off-state.

7. A control method of an imaging apparatus including a face detection sensor that detects a face of a user and outputs a detection result indicating whether the face of the user is detected or not, the control method:

changing an operational state of the imaging apparatus to a first operational state which is a power on state of the imaging apparatus and stopping an operation of the face detection sensor;

determining whether the imaging apparatus is moving or not;

causing the face detection sensor to operate in the first operational state if it is determined that the imaging apparatus is moving in the first operational state; and determining whether the face of the user is detected or not in accordance with the detection result output from the face detection sensor in the first operational state, and changing the operational state of the imaging apparatus from the first operational state to a second operational state which is the power on state of the imaging apparatus and has lower power consumption than the first operational state if it is determined that the face of the user is not detected in accordance with the detection result output from the face detection sensor in the first operational state;

wherein the imaging apparatus further comprising:

an imaging circuit that performs imaging of an object that differs from the user, wherein the program further causes, when executed by the CPU, the imaging apparatus to function as:

an image processing unit configured to process an image from the imaging circuit; and a display unit configured to display an image from the image processing unit, wherein in the first operational state, the control unit performs control so that the imaging circuit, the image processing unit, the display unit, and the movement determination unit operate, and in the second operationalstate, the control unit performs control so that operations of the imaging circuit, the image processing unit, the display unit, and the movement determination unit are stopped.

\* \* \* \* \*